R. W. BELSON.
PATTERN FOR MOLDING STOVE PLATES.

No. 103,966. Patented June 7, 1870.

WITNESSES.
Henry Fisher
John G. Nichols

INVENTOR.
Rich.d Wm Belson

UNITED STATES PATENT OFFICE.

RICHARD WILLIAM BELSON, OF PHILADELPHIA, PENNSYLVANIA.

IMPROVEMENT IN PATTERNS FOR MOLDING STOVE-PLATES.

Specification forming part of Letters Patent No. 103,966, dated June 7, 1870.

I, RICHARD WILLIAM BELSON, of the city and county of Philadelphia, and State of Pennsylvania, have invented certain Improvements in Patterns for Molding Stove-Plates, of which the following is a specification:

Nature and Objects of the Invention.

In the process of molding patterns having lifter-cavities, it often becomes necessary either to use loose parts of patterns, to be withdrawn from the green sand, or to make cores separately and insert them in cavities molded for the purpose, or by indenting, by compression with a tool formed for the purpose, in order to form the necessary lip in the said cavity, either of which plans has proved to be undesirable in practice, and causing the loss of many of the castings; the first process requiring great care and skill on the part of the workman; the second being more expensive, with the danger also of having a rough casting. The latter often produces sand-blows, thus ruining the casting, the result of packing the sand in the act of indenting by compression with the tool to obtain the lip, as described.

The object of this invention is to construct a pattern whereby the sand-cores in the flasks can be plowed or undercut with greater accuracy, facility, and rapidity.

My invention relates to the combination, with the pattern of the desired casting, of a cutter, which will remove a portion of the sand from the end of the core formed by the lifter-cavity in said pattern, by which means the desired lip may be obtained in casting.

Description of the Accompanying Drawings.

Figure 1:
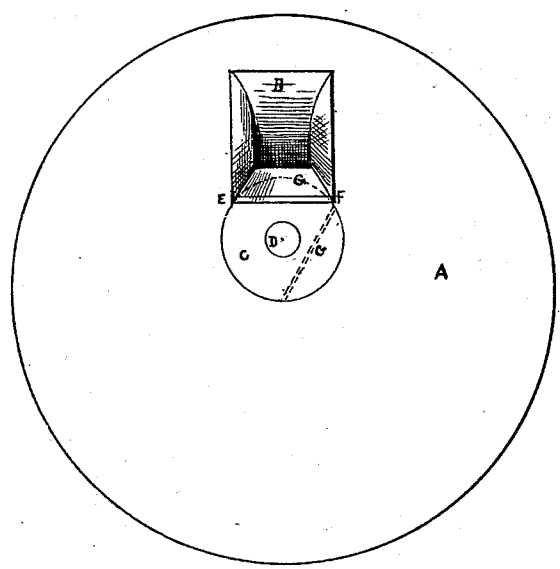
Figure 3:
Figure 2:
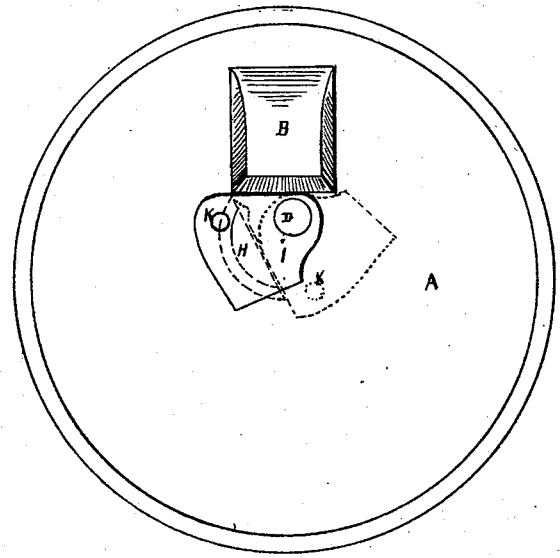

Figure 1 is top view. Fig. 2 is a bottom view. Fig. 3 is a central sectional view.

General Description.

A, Fig. 1, is a plate or pattern; B, the lifter-cavity; C, a circular revolving cutter, fitted in a recess at the inner end of the cavity B, the top of said cutter being even with the top of plate or pattern A. A portion of one side of C has been removed, the chord of which portion corresponds to the width of cavity B, and when in place, the edge of C being beveled, assists in forming a perfect lifter-cavity, the same as if C were a part of A without being movable.

D is the pin on which C revolves. I, Fig. 2, is a thin plate, by which C is actuated through pin D, which connects them. K is a pin in end of plate I, for convenience in moving. H is a hole through the plate under cutter C, and covered by same in top view, and also closed by I in bottom view.

The operation is as follows: The plate I being thrown back against the projection made by cavity B will set the cutter C so that a perfect cavity will be formed in the top of the pattern. Then the pattern is rammed up in the flask in the usual manner. The cope is then lifted off, the pattern remaining in the drag, holding the pattern firmly down. The plate I is then turned until the hole H is fully exposed. The cutter has then been turned, carrying the point E to F, its position then being shown by the dotted lines G G, removing the sand, which is moved forward, and is blown out through hole H. The plate I is then thrown back, carrying cutter C to its former position. The pattern is then lifted off, and it will be found an incision has been made in the end of the core by the cavity B, which, in casting, will produce the required lip for the lifter.

Claim.

I claim as my invention—

The cutter C, combined with pattern A and cavity B, all constructed substantially as set forth, whereby the sand is removed from the core, as described.

RICHD. W. BELSON.

Witnesses:
  HENRY FISHER,
  JOHN G. NICHOLS.